United States Patent
Ravera et al.

(10) Patent No.: US 7,642,756 B2
(45) Date of Patent: *Jan. 5, 2010

(54) ELECTRIC POWER GENERATING SYSTEM

(75) Inventors: Claudio Ravera, Genoa (IT); Antonio Rebora, Serra Ricco' (IT); Andrea Taffone, Genoa (IT); Sandro Tenconi, Milan (IT); Franco Zanzi, Genoa (IT)

(73) Assignee: Ansaldo Energia S.p.A., Genoa (IT)

( * ) Notice: Subject to any disclaimer, the term of this patent is extended or adjusted under 35 U.S.C. 154(b) by 23 days.

This patent is subject to a terminal disclaimer.

(21) Appl. No.: 11/544,936

(22) Filed: Oct. 10, 2006

(65) Prior Publication Data

US 2007/0086132 A1    Apr. 19, 2007

(30) Foreign Application Priority Data

Oct. 7, 2005   (IT)   ............... TO2005A0712

(51) Int. Cl.
H02P 11/00    (2006.01)
H02P 9/00     (2006.01)

(52) U.S. Cl. .................................... 322/17; 322/44

(58) Field of Classification Search ............ 322/22, 322/17, 24, 44, 28; 290/7; 361/62
See application file for complete search history.

(56) References Cited

U.S. PATENT DOCUMENTS

| 4,417,194 | A | * | 11/1983 | Curtiss et al. ............... 322/47 |
| 4,691,119 | A | * | 9/1987 | McCabria ................... 307/84 |
| 4,709,203 | A | | 11/1987 | Roux et al. |
| 5,083,077 | A | * | 1/1992 | Wallace et al. ............. 322/32 |
| 5,686,766 | A | * | 11/1997 | Tamechika ................. 307/43 |
| 5,784,237 | A | | 7/1998 | Velez |
| 5,875,088 | A | | 2/1999 | Matsko et al. |
| 5,940,260 | A | | 8/1999 | Gelbien et al. |
| 6,188,591 | B1 | | 2/2001 | Rüter et al. |
| 6,219,623 | B1 | * | 4/2001 | Wills ......................... 702/60 |
| 6,297,939 | B1 | | 10/2001 | Bilac et al. |
| 6,737,869 | B2 | | 5/2004 | Mody |
| 7,161,257 | B2 | * | 1/2007 | Lakov et al. ............. 290/40 R |
| 7,319,307 | B2 | * | 1/2008 | Wiegman et al. ........... 322/14 |
| 7,400,065 | B2 | | 7/2008 | Michalko et al. |
| 7,439,634 | B2 | | 10/2008 | Michalko et al. |
| 2002/0048179 | A1 | * | 4/2002 | Nomiya et al. ............. 363/50 |
| 2004/0036294 | A1 | | 2/2004 | Kishibata et al. |
| 2007/0086123 | A1 | * | 4/2007 | Ravera et al. ................. 361/1 |
| 2007/0181547 | A1 | * | 8/2007 | Vogel et al. ............. 219/130.1 |

FOREIGN PATENT DOCUMENTS

| DE | 101 31 226 | 1/2003 |
| GB | 846 054 | 8/1960 |
| WO | WO-03073182 | 9/2003 |
| WO | WO-03079511 | 9/2003 |

* cited by examiner

*Primary Examiner*—Julio Cesar Gonzalez
(74) *Attorney, Agent, or Firm*—Blank Rome LLP

(57) ABSTRACT

An electric power generating system connectable to a reconfigurable power distribution network, and wherein a number of alternators, driven by internal combustion engines running at different speeds $\omega 1, \omega 2, \ldots, \omega n$, supply alternating voltages to rectifiers (14) generating rectified voltages $V(r1)$, $V(r2), \ldots, V(rn)$ which are maintained substantially equal.

6 Claims, 4 Drawing Sheets

ELECTRIC POWER GENERATING SYSTEM

FIELD OF THE INVENTION

The present invention relates to an electric power generating system.

BACKGROUND OF THE INVENTION

Electric power generating systems are known comprising a number of alternators, each driven by at least one internal combustion engine (e.g. a diesel or turbogas engine) and generating an alternating output voltage; and the engines are closed-loop controlled to run at substantially the same speed, so that the output voltages of the alternators have the same frequency and phase.

In such known systems, the outputs of the alternators are arranged parallel to sum the output currents which are used to supply a local electric network powering a number of electric loads.

The above systems can also be used to advantage on ships to power on-board electric user devices (motors, lighting, electronic equipment, etc.).

As stated, the internal combustion engines must operate at the same constant speed to sum the alternating output currents.

This can pose serious drawbacks, in that, in many practical applications, the speed of the internal combustion engine does not correspond to the speed which maximizes efficiency and/or reduces consumption and/or minimizes wear of the engine.

As a result, in known power generating systems, consumption is normally high, efficiency less than optimum at the various power outputs, and wear of mechanical component parts is severe.

SUMMARY OF THE INVENTION

It is an object of the present invention to provide an electric power generating system designed to eliminate the drawbacks of known systems.

According to the present invention, there is provided an electric power generating system as claimed in the attached claims.

BRIEF DESCRIPTION OF THE DRAWINGS

The invention will be described with particular reference to the accompanying drawings, in which.

DETAILED DESCRIPTION OF THE INVENTION

Figure 1:
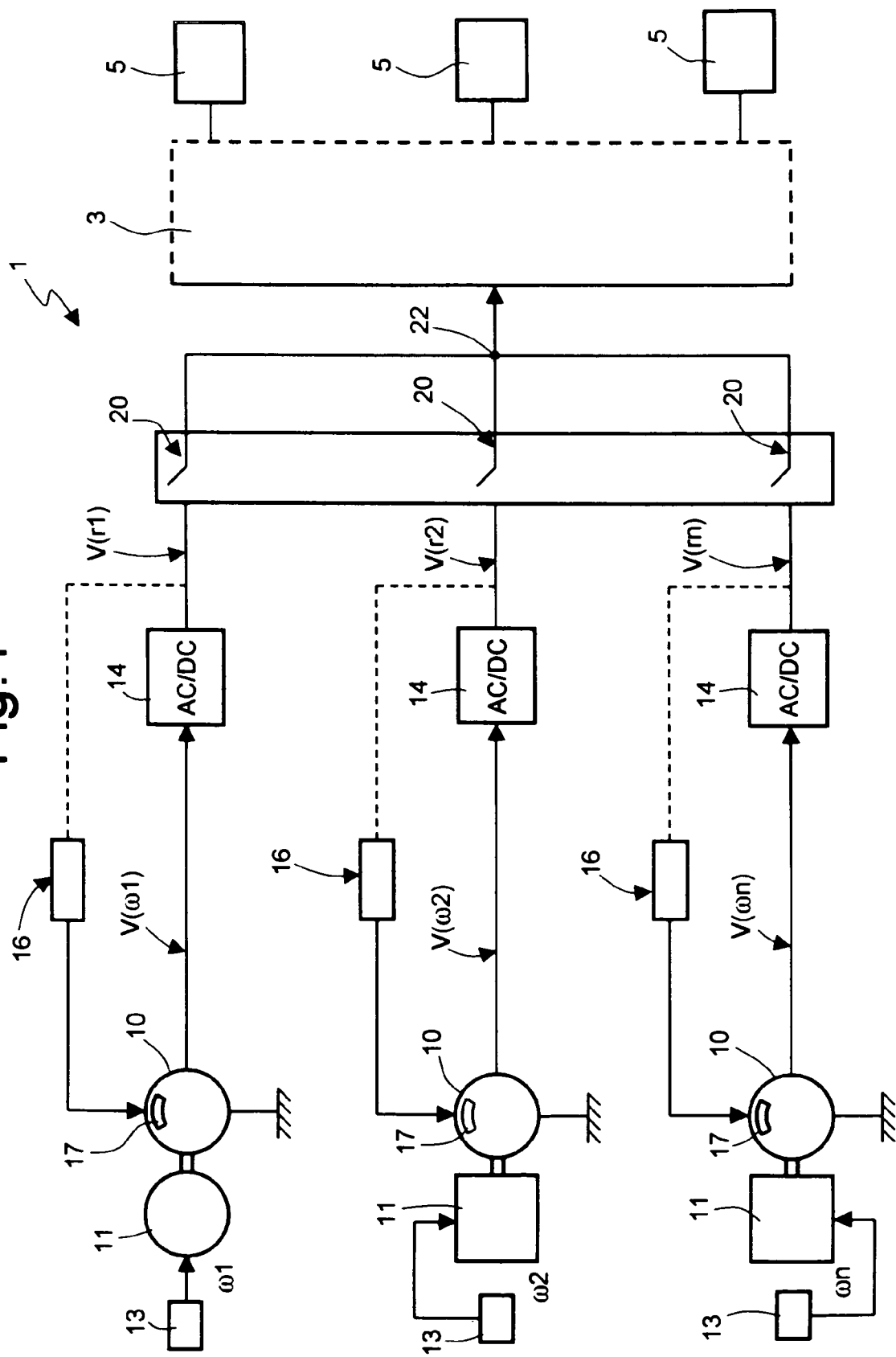
FIG. 1 shows an electric power generating system in accordance with the teachings of the present invention.

Number 1 in FIG. 1 indicates as a whole an electric power generating system connected to a reconfigurable power distribution network 3.

System 1 and network 3 may conveniently, though not exclusively, be used to advantage for generating and distributing electric power on naval vessels, e.g. system 1 may be installed on a warship (not shown), and network 3 used to distribute the power generated locally by system 1 to a number of electric user devices 5 (shown schematically in FIG. 1).

System 1 comprises a number of alternators 10, each driven by a respective internal combustion (e.g. diesel) engine 11 to generate an alternating output voltage. In FIG. 1, alternators 10 are shown schematically as single-phase, but may obviously be other types, e.g. three-phase.

The alternators are driven by engines controlled by electronic central control units 13, which run the engines at normally different speeds $\omega 1, \omega 2, \ldots \omega n$, so that the alternating output voltages $V(\omega 1), V(\omega 2), \ldots, V(\omega n)$ of the alternators have different frequencies.

The speed of each internal combustion engine 11 is conveniently selected by electronic central control unit 13 on the basis of the technical operating characteristics of engine 11, so as to maximize efficiency and/or reduce wear and/or minimize consumption of the engine in relation to the power demanded of the engine.

System 1 comprises a number of rectifiers 14, each of which receives a respective alternating output voltage $V(\omega 1), V(\omega 2), \ldots, V(\omega n)$, and generates a rectified voltage $V(r1), V(r2), \ldots, V(rn)$. According to one aspect of the present invention, closed-loop control devices 16 are provided, each of which determines the rectified voltage at the output of a respective rectifier 14, and acts on respective alternator 10 to keep the respective output voltage $V(r1), V(r2), \ldots, V(rn)$ close to a common target value, so that all the output voltages are substantially equal.

Each control device 16 may conveniently operate by regulating excitation 17 of respective alternator 10. Alternatively, output voltage can be controlled by acting in negative feedback manner on the respective rectifier, or on a chopper/booster (not shown) downstream from the rectifier.

System 1 also comprises a number of circuit breakers 20, each interposed between the output of a respective rectifier 14 and a common adding node 22 defining an output of the electric power generating system.

Figure 2:
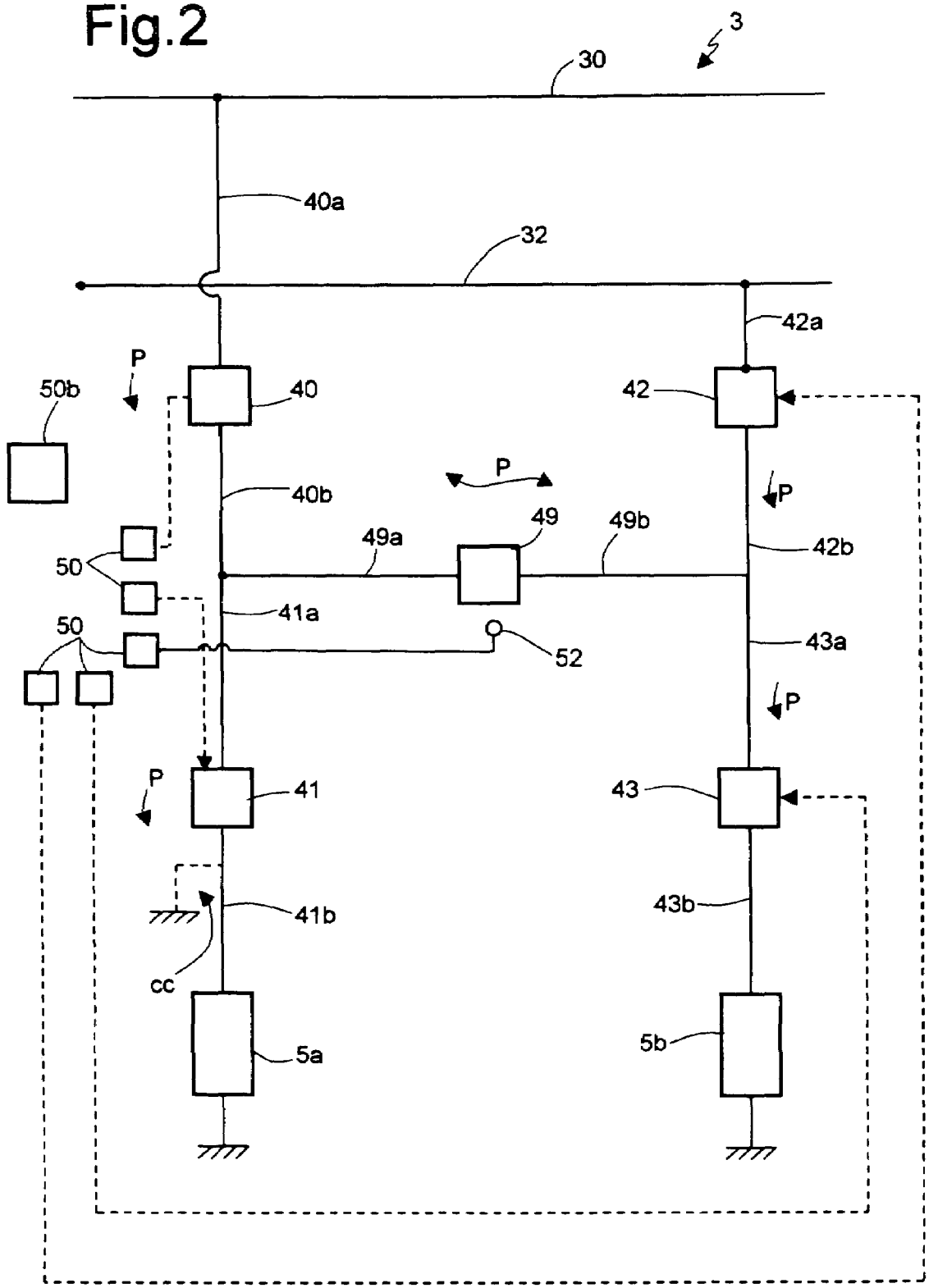
FIG. 2 shows a reconfigurable power distribution network in accordance with the teachings of the present invention.

Number 3 in FIG. 2 indicates a reconfigurable direct-current power distribution network in accordance with the teachings of a further aspect of the present invention.

Network 3 only represents the positive pole of a direct-current system, and is therefore shown schematically as single-pole; the same diagram also, or alternatively, applies to the negative pole of the distribution network.

It should be pointed out that the network layout shown (in this case, an H network) is purely indicative to illustrate operation of network 3, and may be any of various widely differing layouts, such as the loop layout (FIG. 4) described in detail later on.

The example shown comprises a first electric power line (BUS) 30 and a second electric power line (BUS) 32, both of which may be supplied, for example, by the output of generating system 1.

Network 3 comprises a first one-way switch 40 having a first terminal 40a connected to line 30, and a second terminal 40b connected to a first terminal 41a of a second one-way switch 41 also forming part of network 3 and having a second terminal 41b powering an electric load 5a.

Current, and therefore also power, can only flow in switches 40 and 41, when closed, from the a terminal to the b terminal.

Network 3 comprises a third one-way switch 42 having a first terminal 42a connected to line 32, and a second terminal 42b connected to a first terminal 43a of a fourth one-way switch 43 also forming part of network 3 and having a second terminal 43b powering an electric load 5b.

Current, and therefore also power, can only flow in switches 42 and 43, when closed, from the a terminal to the b terminal.

Network 3 also comprises a two-way switch 49 interposed between terminals 40b, 41a and 42b, 43a, and which permits current (and power) flow in opposite directions between its two terminals 49a, 49b.

Network 3 comprises at least one electronic control unit 50 for each switch in the network, to safety control the switches (40, 41, 42, 43, 49 in FIG. 2) and reconfigure network 3, when a short-circuit or overload is detected, on the basis of signals from units 50 of adjacent switches, and regardless of control by a higher network monitoring system (50b). Units 50 conveniently communicate with one another over a high-speed communication system; and each unit 50 may be integrated in the respective switch to reduce sensitivity to electromagnetic noise.

Figure 3:
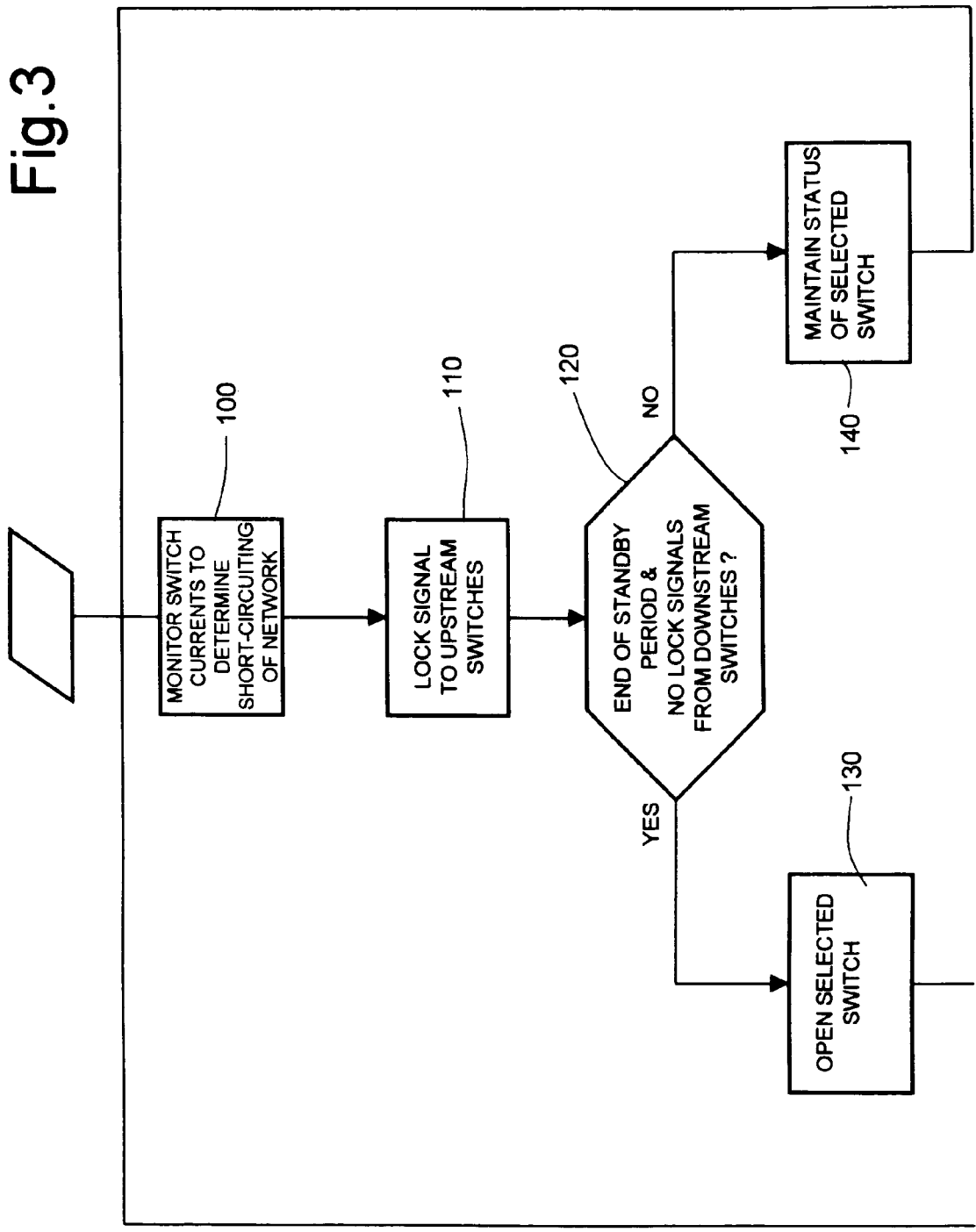
FIG. 3 shows an operating flow chart of the FIG. 2 network.

The FIG. 3 flow chart shows operation of each electronic control unit 50.

As shown in FIG. 3, an initial block 100 monitors current flow in each of the switches in network 3 to determine short-circuiting/overloading of network 3.

A short-circuit/overload can be determined in known manner by determining when the current Iswitch flow in each switch exceeds a threshold value Ilim, i.e.

$$Iswitch > Ilim \qquad (1)$$

Alternatively or in parallel with the above, a short-circuit/overload can be determined when the derivative of the current Iswitch flow in each switch exceeds a threshold value Dlim, i.e.:

$$d(Iswitch)/d(t) > Dlim \qquad (2)$$

When short-circuiting/overloading of a switch is detected, a block 110, downstream from block 100, sends a lock signal to all the switches upstream, with respect to the power flow direction, from the selected switch on which the fault has been detected.

Since switches 40-43 are all one-way, the power flow direction through each switch 40-43 is predetermined, so control unit 50 of each one-way switch knows which one-way switches are located upstream from its own position. For example, switches 40 and 42 are located upstream from switch 41 or 43. Power flow in two-way switch 49 on the other hand is determined by a current sensor (Hall-effect sensor) 52 cooperating with unit 50 of switch 49.

The lock signal results in locking by all the units 50 of the upstream switches, i.e. the switches for which a lock signal has been generated are maintained in the (open/closed) position preceding generation of the lock signal.

Block 110 is followed by a block 120, which determines:

1) whether a standby period has elapsed since the lock signal was generated; and 2) whether, during the standby period, no further lock signals have been generated from switches downstream from the selected switch (with respect to the power flow direction).

For example, switches 41 and 43 are located downstream from switch 40 or 42.

In the event of a positive response, a block 130, downstream from block 120, opens the selected switch—since there are no other switches closer to the short-circuit/overload, i.e. downstream from the selected switch—and then goes back to block 100.

In the event of a negative response, a block 140, downstream from block 120, maintains the preceding status of the selected switch, since at least one switch has been found closer to the short-circuit/overload, i.e. downstream from the selected switch.

Block 140 then goes back to block 100.

The following is an example to explain the above operations more clearly.

Assuming a short-circuit CC (shown by the dash line) occurs close to switch 41, between switch 41 and load 5a.

In this case, electric line 30 being grounded directly, current in switches 40 and 41 increases rapidly, and, if switches 49 and 42 are closed, there is a rapid increase in current in these too.

Electronic units 50 of switches 41, 40, 42, 49 therefore detect a fault, emit lock signals for the switches upstream from the switch (in this case, switches 40, 42, 49), and switch to standby awaiting lock signals from the downstream switches.

In the example shown, there being no more switches between switch 41 and load 5a, switch 41 is opened at the end of the standby period.

On detecting the fault, electronic unit 50 of switch 40 sends a lock signal to the switches immediately upstream from the selected switch (in the example shown, there are no upstream switches) and then switches to standby to await a lock signal from other switches downstream from switch 40.

In the example shown, a lock signal is received from switch 41 downstream from switch 40, so switch 40 is kept closed at the end of the standby period.

The same also applies to switches 42 and 49 if the short-circuit current also flows through switches 42 and 49 to switch 41; in which case, switches 42 and 49 are kept closed when the short-circuit occurs.

Only switch 41 closest to the short-circuit is therefore opened, and power is only cut off to electric user device 5a, whereas electric user device 5b can be kept supplied by switches 42 and 43 and/or 40, 49 and 43.

Even in the presence of a short-circuit, therefore, power is cut off from a minimum number of electric user devices, but is maintained to the electric user devices not close to the short-circuit.

The same also applies in the event of a short-circuit or anomalous absorption by electric user device 5a, in which case too, only switch 41 is opened.

In an alternative embodiment (not shown), alternators 10, engines 11 connected to them, and rectifiers 14 may be formed into two or more groups, each supplying a respective output adding node 22 by means of a circuit breaker of the type indicated 20 in FIG. 1.

For example, assuming two groups, one output node may supply electric power line 30 in FIG. 2, and the other may supply electric power line 32.

Figure 4:
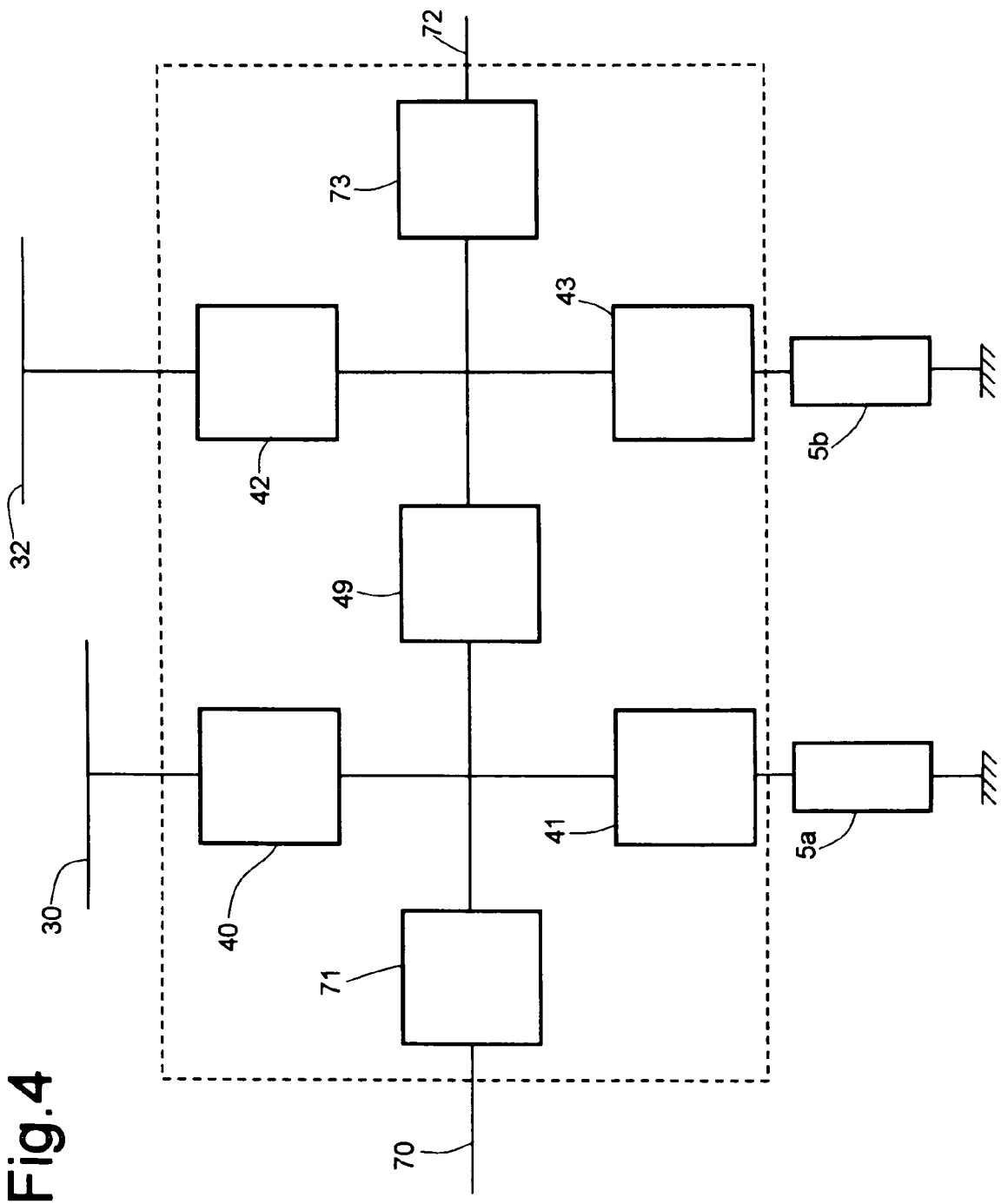
FIG. 4 shows a variation of the FIG. 2 network.

In another embodiment shown in FIG. 4, the reconfigurable network comprises the same switches 40, 42, 49, 41, 43 as in FIG. 2, and the same loads 5a and 5b. The switches have the same layout as before, and therefore not described in detail.

In addition, a second two-way switch 71 is provided, with a first terminal connected to the common terminals of switches 40, 41, and a second terminal connected to a loop bus 70.

Similarly, a third two-way switch 73 is provided, with a first terminal connected to the common terminals of switches 42, 43, and a second terminal connected to a loop bus 72.

Loop buses 70, 72 are connected to other networks of the type shown in FIG. 2.

The network may thus comprise a number of H networks 3 interconnected by loop buses 70, 72, in turn protected by two-way switches 71 and 73.

What is claimed is:

1. An electric power generating system connectable to a power distribution network, in particular a reconfigurable network, said electric power generating system comprising:

a number of alternators, each driven by at least one internal combustion engine and generating an alternating output voltage; said engines running at normally different speeds ω1, ω2, ... ωn, so that at least the output voltages V(ω1), V(ω2), ..., V(ωn) of two different alternators have different frequencies;

a number of rectifiers, each of which receives a respective alternating output voltage V(ω1), V(ω2), ..., V(ωn), and generates a rectified voltage V(r1), V(r2), ..., V(rn);

closed-loop control means, which determine the rectified voltage at the output of each rectifier, and act in negative feedback manner to keep the output voltage V(r1), V(r2), ..., V(rn) equal to a common target value, so that all the rectified output voltages are substantially equal; and adding means which feed the rectified output voltages to a common node defining an output of the electric power generating system.

2. A system as claimed in claim 1, and comprising an electronic central control unit connected to each internal combustion engine; said central control unit running said internal combustion engine at such a speed at to maximize efficiency and/or reduce wear and/or minimize consumption of the engine.

3. A system as claimed in claim 1, wherein said closed-loop control means act in negative feedback manner on the excitation of said alternators to keep the output voltage V(r1), V(r2), ..., V(rn) equal to said common target value.

4. A system as claimed in claim 1, wherein said network is reconfigurable, and comprises:

a number of power lines and/or connecting lines; and a number of switches for carrying electric power between said lines and electric user devices;

characterized in that said network comprises an electronic control unit for safety controlling the switches, on the basis of incoming signals indicating a short-circuit/overload in the network, and on the basis of electronic power flow through the switches, to reconfigure the network upon detection of a short-circuit or overload; and wherein said electronic control unit comprises:

monitoring means which monitor current flow in the switches to determine short-circuit/overloading of the network;

disabling means selectable upon detection of a short-circuit/overload of a selected switch; said disabling means sending a lock signal to all the switches upstream from the selected switch with respect to the power flow direction; said lock signal resulting in locking of all the upstream switches, which are maintained in the switch position (open/closed) preceding generation of the lock signal;

time-out means which determine whether a standby period has elapsed since generation of the lock signal, and whether, during the standby period, no other lock signals have been generated relative to switches downstream from the selected switch;

in the event of a positive response, said time-out means selecting opening means which command opening of the selected switch;

in the event of a negative response, said time-out means selecting hold means which maintain the switch status of the selected switch.

5. A system as claimed in claim 4, wherein said monitoring means determine whether the current Iswitch flow in each switch exceeds a threshold value Ilim, i.e. Iswitch>Ilim(1).

6. A system as claimed in claim 4, wherein said monitoring means determine whether the derivative of the current Iswitch flow in each switch exceeds a threshold value Dlim, i.e.:

$$d(Iswitch)/d(t) > Dlim \qquad (2).$$

* * * * *

UNITED STATES PATENT AND TRADEMARK OFFICE
CERTIFICATE OF CORRECTION

PATENT NO. : 7,642,756 B2
APPLICATION NO. : 11/544936
DATED : January 5, 2010
INVENTOR(S) : Ravera et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this

Twenty-first Day of December, 2010

David J. Kappos
*Director of the United States Patent and Trademark Office*